(12) United States Patent
Fenchak et al.

(10) Patent No.: US 9,499,088 B1
(45) Date of Patent: Nov. 22, 2016

(54) VEHICLE TIE-DOWN CLEAT ASSEMBLY

(71) Applicant: SRG Global Inc., Warren, MI (US)

(72) Inventors: Patrick Fenchak, Rochester Hills, MI (US); Richard Costello, Clinton Township, MI (US)

(73) Assignee: SRG GLOBAL INC., Warren, MI (US)

( * ) Notice: Subject to any disclaimer, the term of this patent is extended or adjusted under 35 U.S.C. 154(b) by 0 days.

(21) Appl. No.: 15/058,510

(22) Filed: Mar. 2, 2016

(51) Int. Cl.
*B60P 7/08* (2006.01)

(52) U.S. Cl.
CPC ............... *B60P 7/0807* (2013.01); *B60P 7/08* (2013.01)

(58) Field of Classification Search
CPC .................................. B60P 7/0807; B60P 7/08
USPC ........ 410/106, 107, 109, 110, 111, 113, 116; 114/218; 24/115 K, 265 CD; 248/499
See application file for complete search history.

(56) References Cited

U.S. PATENT DOCUMENTS

| | | | |
|---|---|---|---|
| 6,039,520 A | 3/2000 | Cheng | |
| 6,918,721 B2 * | 7/2005 | Venton-Walters | .... B60P 7/0807 410/102 |
| 7,040,849 B2 | 5/2006 | Cunningham et al. | |
| 7,549,828 B2 * | 6/2009 | Smith | ................... B60P 7/0807 410/106 |
| 7,815,405 B2 | 10/2010 | Aftanas | |
| 8,277,157 B2 | 10/2012 | Parsons | |

* cited by examiner

*Primary Examiner* — Stephen Gordon
(74) *Attorney, Agent, or Firm* — Remarck Law Group PLC

(57) ABSTRACT

A vehicle tie-down cleat assembly can include (i) a tie-down cleat defining an upper portion and a lower portion, wherein the upper portion defines at least one aperture or member configured to receive a tying member, and wherein the tie-down cleat comprises a plastic housing and a metal insert disposed within the plastic housing, and (ii) a base assembly coupled to the lower portion of the tie-down cleat and configured to be removably coupled to a surface of a storage compartment of the vehicle, the base assembly comprising a base member, a hinge coupled to the lower portion of the tie-down cleat and the base member, the hinge being configured to allow the tie-down cleat to rotate with respect to the base assembly, and a locking system configured to lock/unlock the tie-down cleat assembly to a mounting plate mounted to a surface of a vehicle storage compartment.

20 Claims, 8 Drawing Sheets

VEHICLE TIE-DOWN CLEAT ASSEMBLY

FIELD

The present disclosure generally relates to vehicle storage accessories and, more particularly, to a vehicle tie-down cleat assembly.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle can have a storage compartment that can be used for storing and transporting items. Example storage compartments are the trunk or hatch of a passenger vehicle, such as a coupe/sedan/utility vehicle and a container or bed of a truck. To mitigate movement of the items during transportation, which could potentially cause damage to the items and/or the vehicle, storage accessories can be used to secure the items. Examples of the vehicle storage accessories can include anchor devices and tying members, such as ropes and tie-down belts/straps. A user can tie/secure a particular tying member around an item and then to a particular anchor device to thereby secure the item within the storage compartment. The storage compartment, therefore, can include multiple anchor devices that a user can utilize to secure multiple items in the storage compartment, or to better secure one item in the storage compartment. One example of these anchor devices is a tie-down cleat.

SUMMARY

A tie-down cleat assembly for a vehicle is presented. The assembly can include a tie-down cleat defining an upper portion and a lower portion, wherein the upper portion defines at least one aperture or member configured to receive a tying member. The tie down cleat can comprise a plastic housing and a metal insert disposed within the plastic housing. The assembly can also include a base assembly coupled to the lower portion of the tie-down cleat and configured to be removably coupled to a surface of a storage compartment of the vehicle. The base assembly can comprise a base member, a hinge coupled to the lower portion of the tie-down cleat and the base member, the hinge being configured to allow the tie-down cleat to rotate with respect to the base assembly, a lock device coupled to the base member and defining a lock member that is rotatable between locked/unlocked positions, and a lock control device coupled to the lock device through the base member and configured to control rotation of the lock device.

In some embodiments, the plastic housing is molded over the metal insert. In some embodiments, the metal insert is made of stainless steel.

In some embodiments, the hinge is a spring-loaded hinge configured to return to a base position. In some embodiments, the base assembly is arranged at approximately a ninety degree angle with respect to the tie-down cleat when the hinge is in the base position. In some embodiments, the hinge is configured to allow the tie-down cleat to rotate in both directions with respect to the base position.

In some embodiments, the lock control device a screw-type lock control device. In some embodiments, the screw-type lock control device includes a shaped socket configured to be controlled by a shaped key.

In some embodiments, the tie-down cleat defines three apertures and two members configured to receive the tie-down device. In some embodiments, a center aperture of the three apertures is larger than two opposing end apertures of the three apertures.

Another tie-down cleat assembly for a vehicle is also presented. The assembly can include a mounting plate configured to be mounted to a surface of a storage compartment of a vehicle, the mounting plate defining an aperture. The assembly can include a tie-down cleat defining an upper portion and a lower portion, wherein the upper portion defines at least one aperture or member configured to receive a tying member. The tie-down cleat can comprise a plastic housing and a metal insert disposed within the plastic housing. The assembly can also include a base assembly coupled to the lower portion of the tie-down cleat and configured to be removably coupled to the mounting plate via its aperture. The base assembly can comprise a base member, a hinge coupled to the lower portion of the tie-down cleat and the base member, the hinge being configured to allow the tie-down cleat to rotate with respect to the base assembly, a lock device coupled to the base member and defining a lock member that is rotatable between locked/unlocked positions, and a lock control device coupled to the lock device through the base member and configured to control rotation of the lock device.

In some embodiments, the plastic housing is molded over the metal insert. In some embodiments, the metal insert is made of stainless steel.

In some embodiments, the hinge is a spring-loaded hinge configured to return to a base position. In some embodiments, the base assembly is arranged at approximately a ninety degree angle with respect to the tie-down cleat when the hinge is in the base position. In some embodiments, the hinge is configured to allow the tie-down cleat to rotate in both directions with respect to the base position.

In some embodiments, when the base assembly is coupled to the mounting plate, the base assembly is approximately parallel to the mounting plate and the tie-down cleat is approximately perpendicular to the mounting plate. In some embodiments, the base member is configured to be received by a lower portion of the aperture of the mounting plate, and wherein the lock device and lock control device are configured to be received by a smaller upper portion of the aperture of the mounting plate. In some embodiments, the lock member defines an elongate shape that, in the unlocked position, corresponds to an elongate shape of the upper portion of the aperture of the mounting plate.

In some embodiments, the lock control device a screw-type lock control device defining a shaped socket configured to be controlled by a shaped key.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, a tie-down cleat is one example of an anchor device that can be used to tie/secure a tying member around an item in a vehicle storage compartment. Conventional tie-down cleats are entirely plastic and have low load limits (e.g., a few hundred pounds). Increasing the load limits of conventional tie-down cleats can be expensive. In addition, conventional tie-down cleats are fixed and thus cannot be adjusted by the user while securing items in the storage compartment or otherwise locked/removed. Further, in some vehicles (e.g., pickup trucks) the tie-down cleats may be visible to others and thus the tie-down cleats should be visually appealing to the user. Accordingly, improved tie-down cleat assemblies for a vehicle are presented. The tie-down cleat assemblies can provide for a higher load limit (e.g., 2000+ pounds) at reduced costs, can be adjusted and locked/removed, and can be more visually appealing to the user. In some embodiments, the tie-down cleat assemblies can include a mounting plate.

Figure 1:
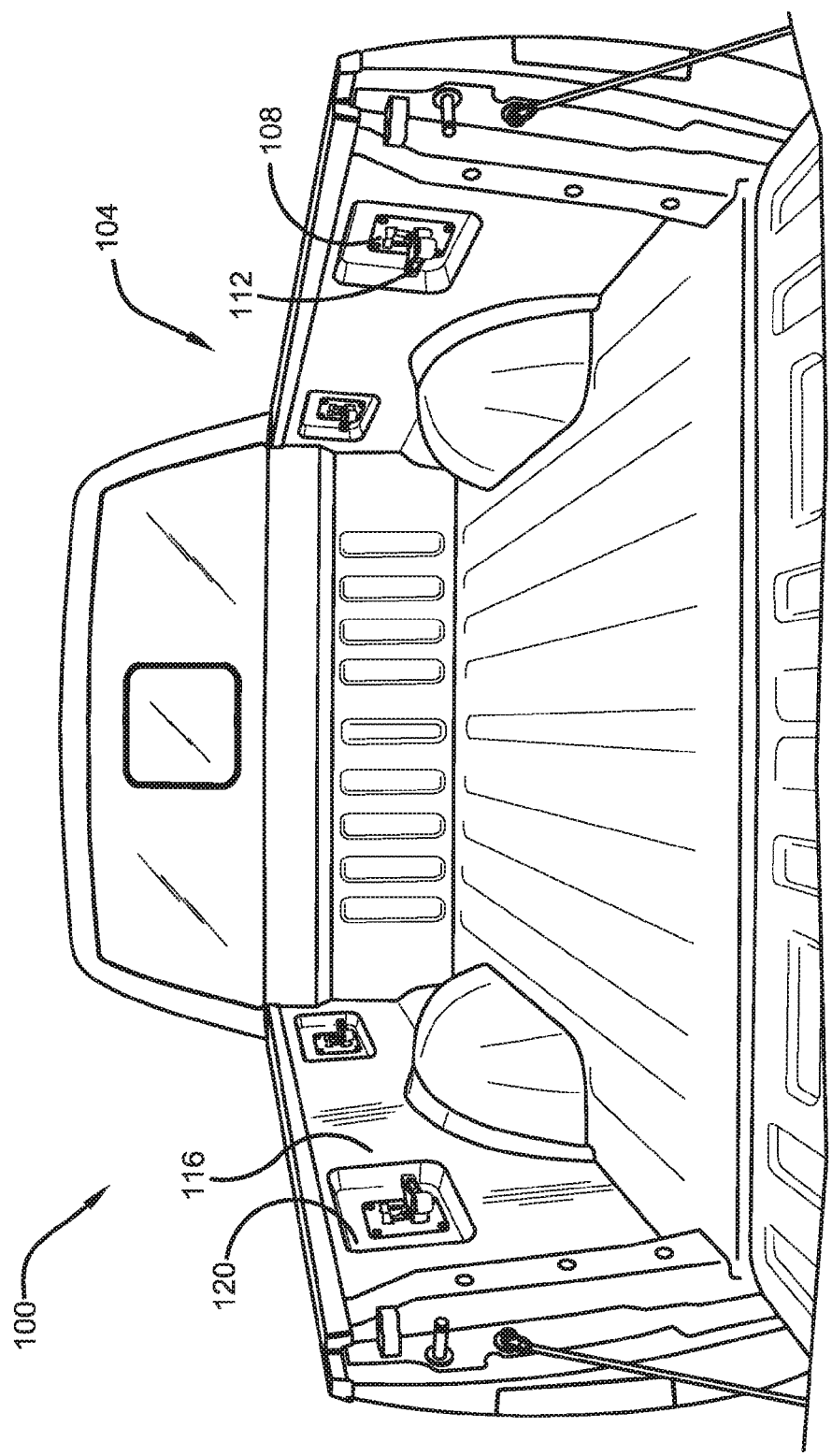
FIG. 1 is a view of an example vehicle having a storage compartment with an example mounting plate and an example tie-down cleat assembly according to some implementations of the present disclosure.

Referring now to FIG. 1, a perspective view of an example vehicle 100 is illustrated. The vehicle 100 can include a storage compartment 104 that is configured to store and transport items. While the vehicle 100 is shown to be a pickup truck and the storage compartment 104 is shown to be a pickup truck bed, it will be appreciated that the systems of the present disclosure could be implemented in any suitable vehicle/storage compartment, such as a trunk/hatch of a passenger vehicle or a container of a truck. In some implementations, the storage compartment 104 can include at least one example mounting plate 108 configured to receive removable accessories, such as an example tie-down cleat assembly 112 of the present disclosure. For example only, the storage compartment 104 could include four mounting plates 108 arranged on sidewall surfaces 116 and four corresponding tie-down cleat assemblies 112. While the mounting plate 108 is shown and discussed herein, it will be appreciated that the tie-down cleat assembly 112 could be directly mounted to the vehicle 100, such as to the sidewall surfaces 116 of the storage compartment 104.

Figure 2:
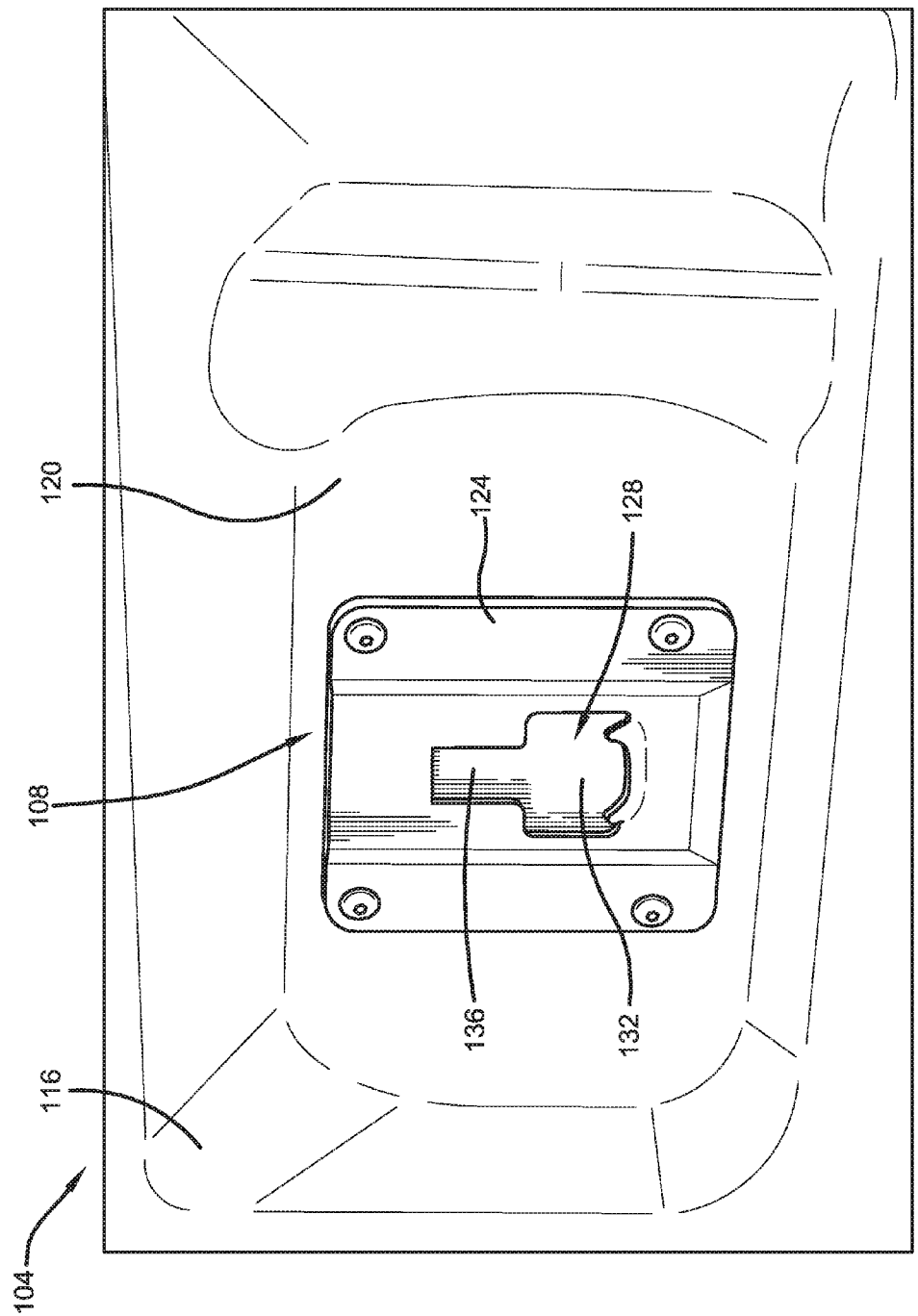
FIG. 2 is a perspective view of the example mounting plate of FIG. 1.
Figure 3:
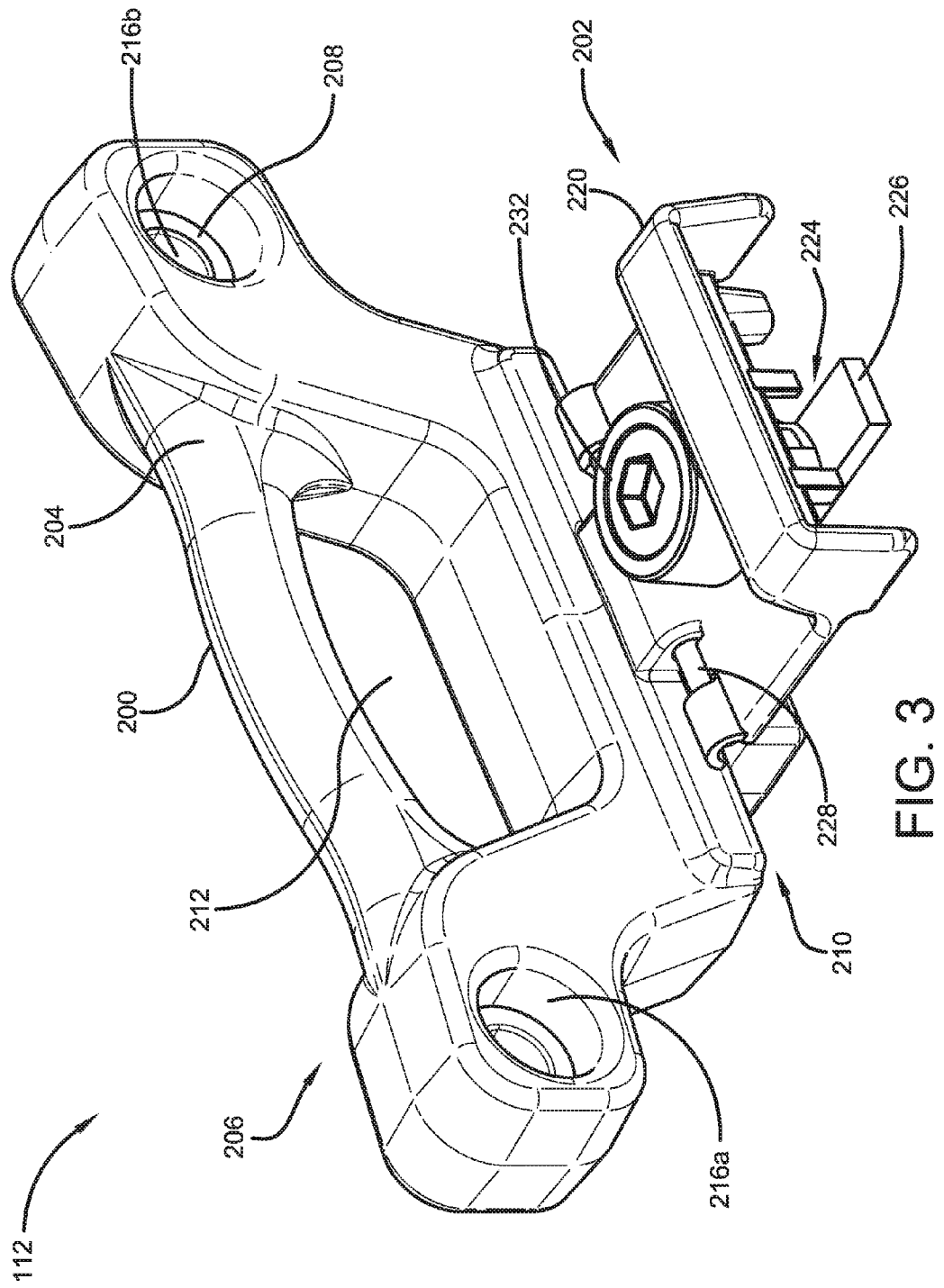
FIG. 3 is a perspective view of an example tie-down cleat assembly according to some implementations of the present disclosure.
Figure 4:
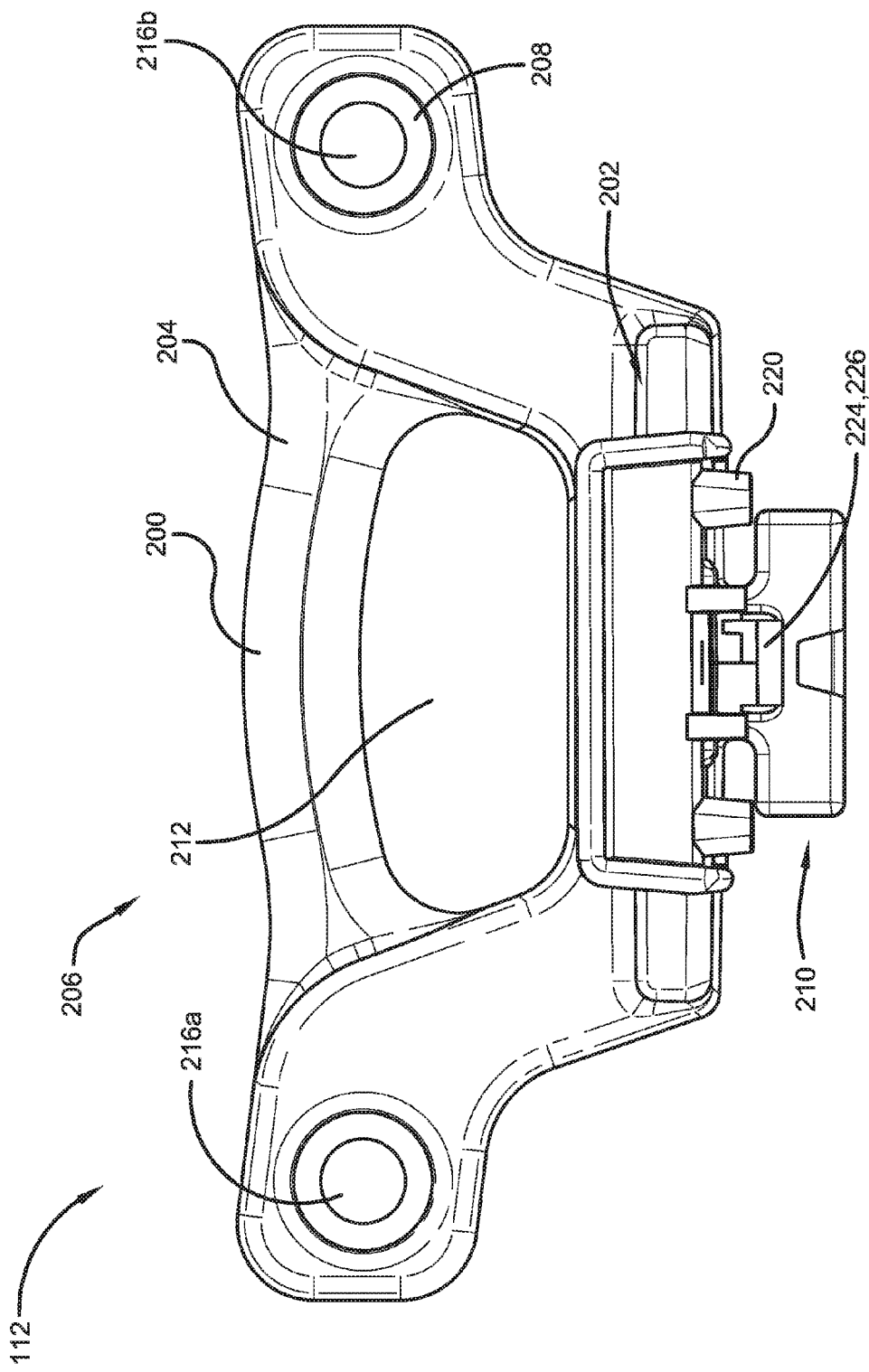
FIG. 4 is a front view of the example tie-down cleat assembly of FIG. 3.
Figure 5:
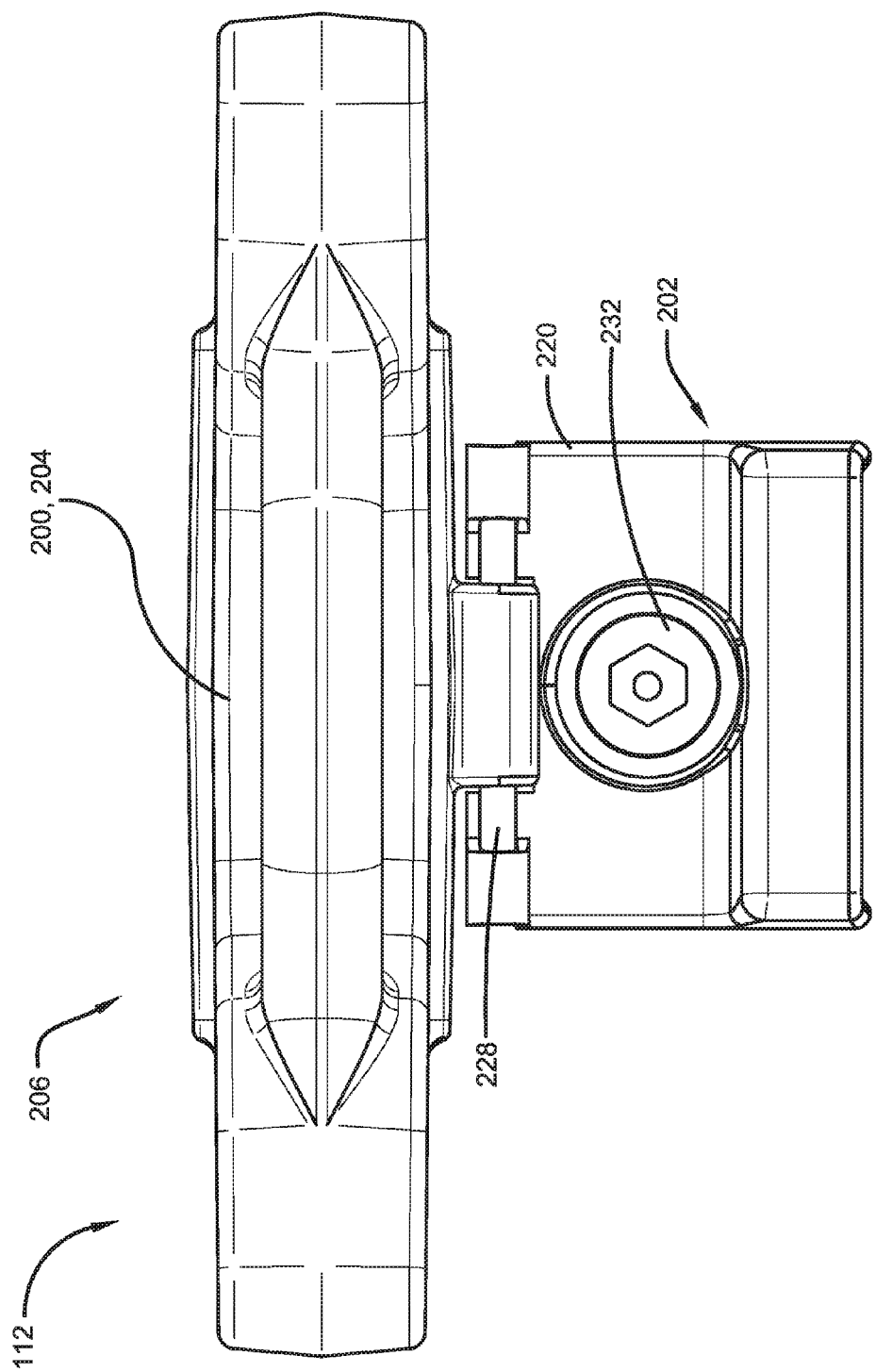
FIG. 5 is a top view of the example tie-down cleat assembly of FIG. 3.
Figure 6:
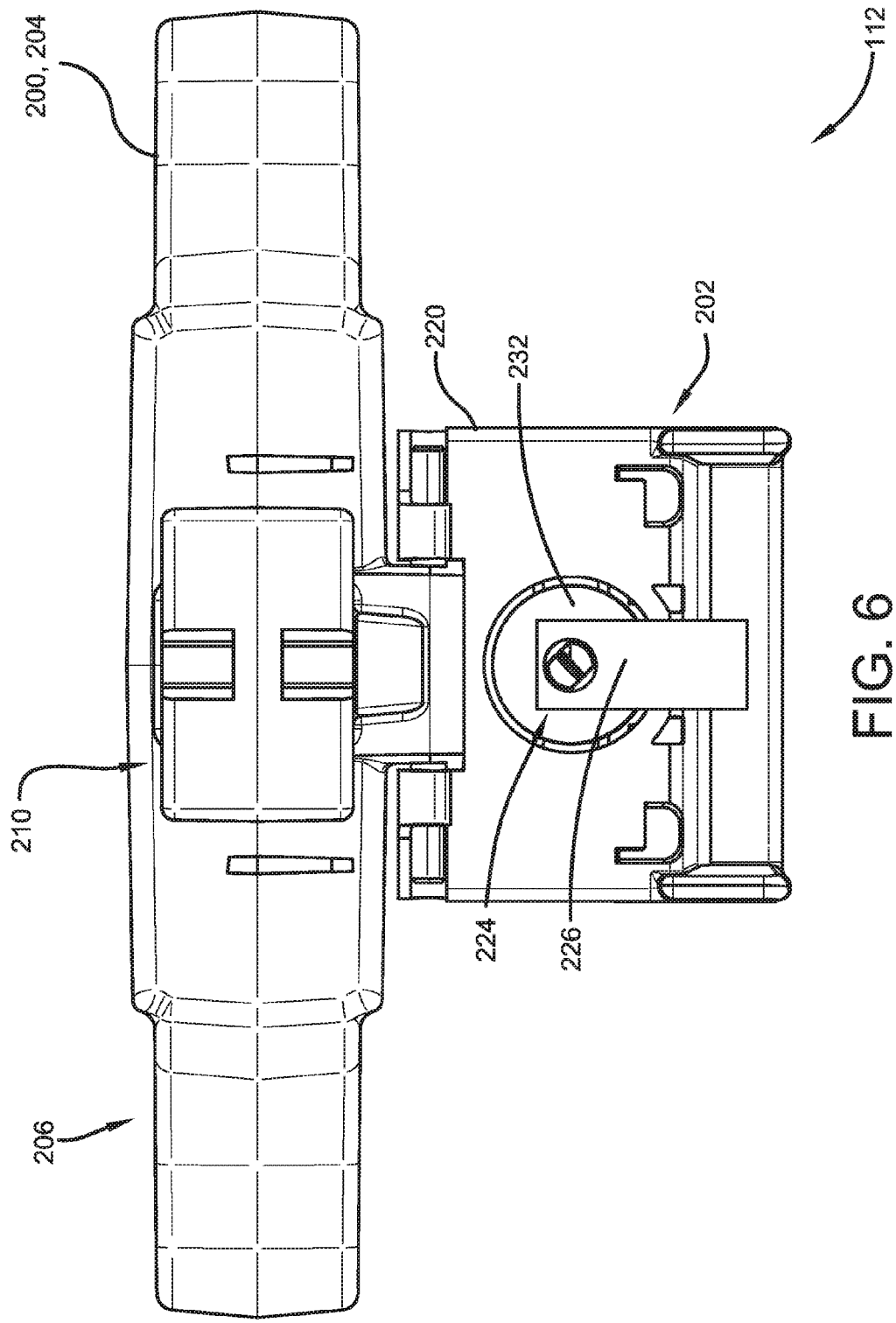
FIG. 6 is a bottom view of the example tie-down cleat assembly of FIG. 3.
Figure 7:
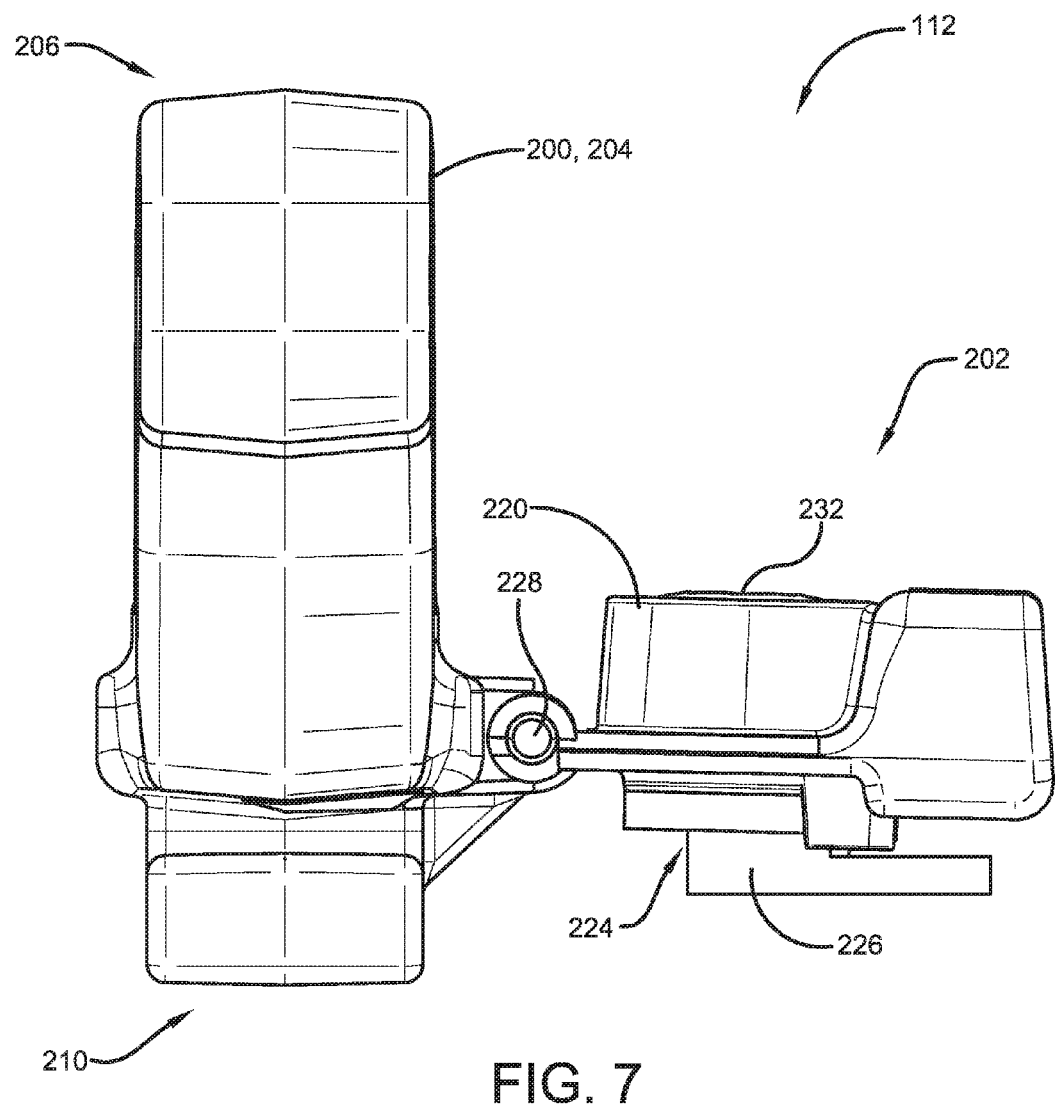
FIG. 7 is a side view of the example tie-down cleat assembly of FIG. 3.

Referring now to FIG. 2, a perspective view of the example mounting plate 108 is illustrated. As shown, the mounting plate 108 is mounted to one of the sidewall surfaces 116 of the storage compartment 104 of the vehicle 100. In some implementations, the sidewall surface 116 can define a recessed portion 120 such that, when mounted, the mounting plate 108 is flush or approximately flush with a remainder of the sidewall surface 116. The mounting plate 108 can define a plate 124 and an aperture 128. The aperture 128 can be configured to receive a portion of vehicle storage accessories, such as the tie-down cleat assembly 112. The aperture 128, therefore, may define a non-uniform shape. For example, as shown, a bottom portion 132 of the aperture 128 is larger than a top portion 136 of the aperture. For the tie-down cleat assembly 112, the bottom portion 132 may correspond to a base/hinge portion and the top portion 136 may correspond to a lock portion, which are now discussed in greater detail.

Referring now to FIGS. 3-7, different views of the example tie-down cleat assembly 112 are illustrated. The tie-down cleat assembly 112 can include a tie-down cleat 200 and a base assembly 202. The tie-down cleat 200 can define an upper portion 206 and a lower portion 210. The tie-down cleat 200 can include a housing 204. The housing 204 can be made of a lightweight, non-metal material such as plastic. Disposed within the housing 204 can be a metal insert 208. For example only, the metal insert 208 may be steel, such as high-strength steel or high-strength stainless steel. In one implementation, the high-strength steel or stainless steel may define a strength corresponding to a desired load limit of the system (e.g., 2000+ pounds). In some implementations, the housing 204 is molded over the metal insert 208 (e.g., plastic molded over stainless steel), such as via an injection molding process. The housing 204 can define a large center aperture 212 and two smaller end apertures 216a, 216b. These apertures 212, 216a, 216b can be utilized to anchor ropes/straps. The bottom portion 210 of the tie-down cleat 200 can be coupled to the base assembly 202 that in some implementations is configured to be removably coupled to the mounting plate 108. In some implementations, the cross-sectional area of the metal insert 208 is slightly larger than that of the housing 204 and thus the metal insert 208 may be visible in some or all of the apertures 212, 216a, and 216b. This may be due, for example, to manufacturing concerns whereby the metal insert 208 must be retained in an injection mold and thus a portion of the metal insert 208 remains exposed. In some implementations, this exposed portion of the metal insert 208 may have a corrosion-resistive coating applied thereto.

The base assembly 202, which may also be constructed of a lightweight material such as plastic, can include a base member 220 that is coupled to the bottom portion 210 of the tie-down cleat 200 via a hinge 228. The hinge 228 is configured to allow the base assembly 202 to rotate with respect to the tie-down cleat 200. In some implementations, the hinge 228 is a spring-loaded hinge that is configured to return to a base position (e.g., approximately a 90 degree angle between the tie-down cleat 200 and the base assembly 202). The hinge 228 may also be configured to enable the tie-down cleat 200 to rotate in both directions with respect to the base assembly 202. The base assembly 202 can also include a lock device 224 and a lock control device 232. The lock control device 232 may be coupled to the lock device 224 through the base member 220. The lock device 224, for example, may define a lock member 226 that is rotatable between locked/unlocked positions. In some implementations, the lock control device 232 can be configured to rotate the lock member 226 to lock the tie-down cleat assembly 112 in place (e.g., in the mounting plate 108). While the lock control device 232 is shown to have a shaped socket, and suitable rotating lock control device can be utilized. The shaped socket can be configured to receive a shaped key for accessing the lock control device 232 to control/rotate the lock device 224. In one implementation, the shape of the socket and key is hexagonal, although it will be appreciated that any suitable shape could be used.

Figure 8:
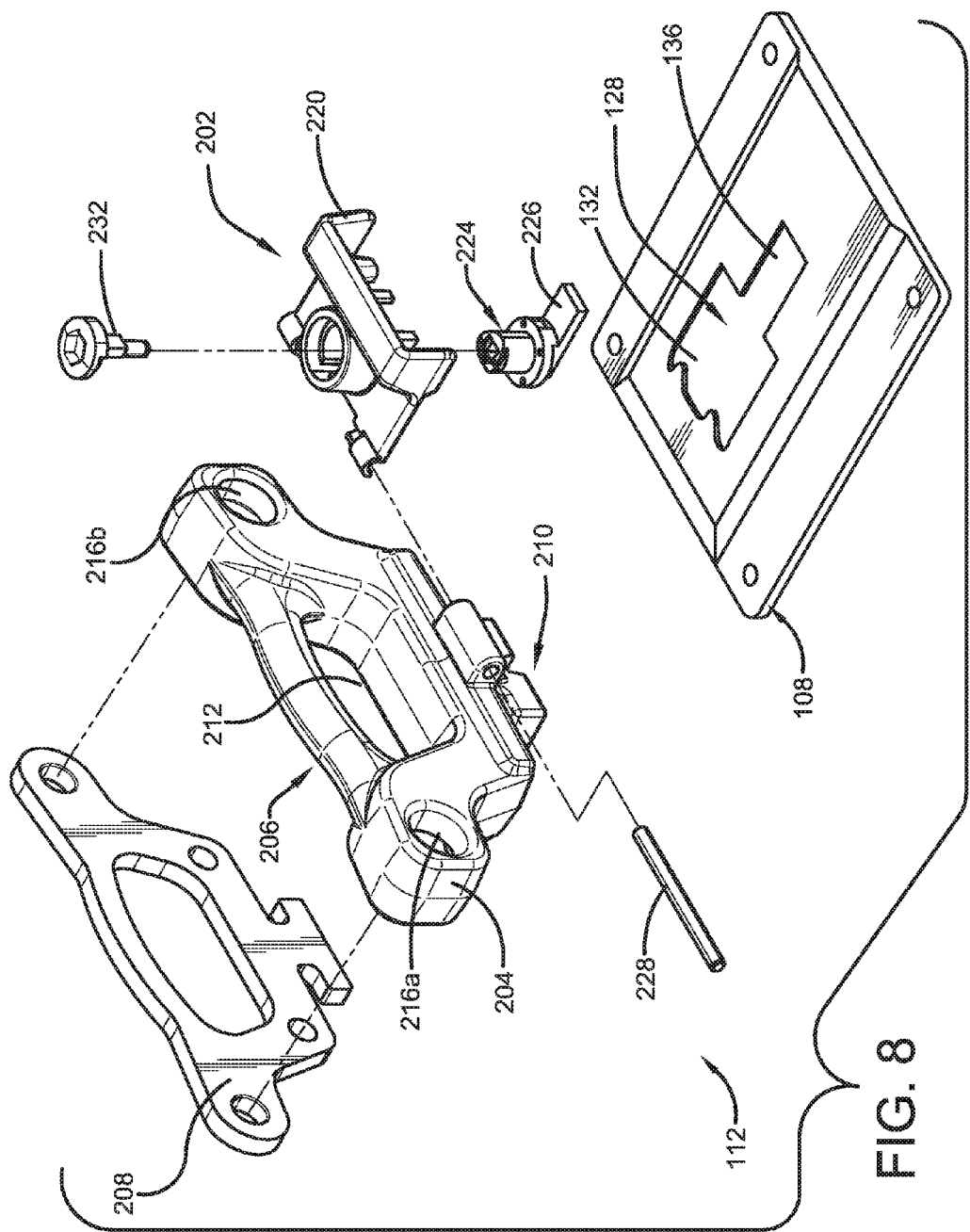
FIG. 8 is an exploded view of the example tie-down cleat assembly of FIG. 3 and the example mounting plate of FIG. 2.

Referring specifically to FIG. 8, the bottom portion of the tie-down cleat 200 is sized to be received by the lower portion 132 of the aperture 128 of the mounting plate 108 and the base assembly 202 is sized to be received by the upper portion 136 of the aperture 128 of the mounting plate 108. As shown, the lock device 224 can define a shape corresponding to the upper portion 136 of the aperture 128. When rotated into the locked position, however, the lock device 224 can be located behind the mounting plate 108 thereby locking the tie-down cleat assembly 112 to the mounting plate 108. By locking the tie-down cleat assembly 112 to the mounting plate 108, potential theft can be mitigated or prevented. The removability can provide the user with flexibility regarding when to utilize the tie-down cleat assembly 112 compared to a fixed anchor device.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tie-down cleat assembly for a vehicle, the tie-down cleat assembly comprising:
   a tie-down cleat defining an upper portion and a lower portion, wherein the upper portion defines at least one aperture or member configured to receive a tying member, and wherein the tie-down cleat comprises:
   a plastic housing, and
   a metal insert disposed within the plastic housing; and
   a base assembly coupled to the lower portion of the tie-down cleat and configured to be removably coupled to a surface of a storage compartment of the vehicle, the base assembly comprising:
   a base member,
   a hinge coupled to the lower portion of the tie-down cleat and the base member, the hinge being configured to allow the tie-down cleat to rotate with respect to the base assembly,
   a lock device coupled to the base member and defining a lock member that is rotatable between locked and unlocked positions, and
   a lock control device coupled to the lock device through the base member and configured to control rotation of the lock device.

2. The tie-down cleat assembly of claim 1, wherein the plastic housing is molded over the metal insert.

3. The tie-down cleat assembly of claim 2, wherein the metal insert is made of stainless steel.

4. The tie-down cleat assembly of claim 1, wherein the hinge is a spring-loaded hinge configured to return to a base position.

5. The tie-down cleat assembly of claim 4, wherein the base assembly is arranged at approximately a ninety degree angle with respect to the tie-down cleat when the hinge is in the base position.

6. The tie-down cleat assembly of claim 5, wherein the hinge is configured to allow the tie-down cleat to rotate in two directions with respect to the base position.

7. The tie-down cleat assembly of claim 1, wherein the lock control device is a screw-type lock control device.

8. The tie-down cleat assembly of claim 7, wherein the screw-type lock control device includes a hexagonal socket.

9. The tie-down cleat assembly of claim 1, wherein the tie-down cleat defines three apertures and two members configured to receive the tie-down device.

10. The tie-down cleat assembly of claim 9, wherein a center aperture of the three apertures is larger than two opposing end apertures of the three apertures.

11. A tie-down cleat assembly for a vehicle, the tie-down cleat assembly comprising:
    a mounting plate configured to be mounted to a surface of a storage compartment of a vehicle, the mounting plate defining an aperture;
    a tie-down cleat defining an upper portion and a lower portion, wherein the upper portion defines at least one aperture or member configured to receive a tying member, and wherein the tie-down cleat comprises:
    a plastic housing, and
    a metal insert disposed within the plastic housing; and
    a base assembly coupled to the lower portion of the tie-down cleat and configured to be removably coupled to the mounting plate via the mounting plate aperture, the base assembly comprising:

a base member, a hinge coupled to the lower portion of the tie-down cleat and the base member, the hinge being configured to allow the tie-down cleat to rotate with respect to the base assembly, a lock device coupled to the base member and defining a lock member that is rotatable between locked and unlocked positions, and a lock control device coupled to the lock device through the base member and configured to control rotation of the lock device.

12. The tie-down cleat assembly of claim 11, wherein the plastic housing is molded over the metal insert.

13. The tie-down cleat assembly of claim 12, wherein the metal insert is made of stainless steel.

14. The tie-down cleat assembly of claim 11, wherein the hinge is a spring-loaded hinge configured to return to a base position.

15. The tie-down cleat assembly of claim 14, wherein the base assembly is arranged at approximately a ninety degree angle with respect to the tie-down cleat when the hinge is in the base position.

16. The tie-down cleat assembly of claim 15, wherein the hinge is configured to allow the tie-down cleat to rotate in two directions with respect to the base position.

17. The tie-down cleat assembly of claim 14, wherein when the base assembly is coupled to the mounting plate, the base assembly is approximately parallel to the mounting plate and the tie-down cleat is approximately perpendicular to the mounting plate.

18. The tie-down cleat assembly of claim 17, wherein the base member is configured to be received by a lower portion of the aperture of the mounting plate, and wherein the lock device and lock control device are configured to be received by a smaller upper portion of the aperture of the mounting plate.

19. The tie-down cleat assembly of claim 18, wherein the lock member defines an elongate shape that, in the unlocked position, corresponds to an elongate shape of the upper portion of the aperture of the mounting plate.

20. The tie-down cleat assembly of claim 11, wherein the lock control device is a screw-type lock control device defining a hexagonal socket.

* * * * *